US009579932B2

(12) United States Patent
Mitarai (10) Patent No.: US 9,579,932 B2
(45) Date of Patent: Feb. 28, 2017

(54) RUN FLAT TIRE (75) Inventor: Yasuo Mitarai, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 371 days.

(21) Appl. No.: 14/342,736

(22) PCT Filed: Aug. 29, 2012

(86) PCT No.: PCT/JP2012/071755
§ 371 (c)(1),
(2), (4) Date: Jun. 5, 2014

(87) PCT Pub. No.: WO2013/038903
PCT Pub. Date: Mar. 21, 2013

(65) Prior Publication Data
US 2014/0305567 A1    Oct. 16, 2014

(30) Foreign Application Priority Data

Sep. 15, 2011 (JP) ................................ 2011-201248

(51) Int. Cl.
*B60C 13/00* (2006.01)
*B60C 13/02* (2006.01)
(Continued)

(52) U.S. Cl.
CPC ........... *B60C 13/02* (2013.01); *B60C 15/0036* (2013.04); *B60C 17/0009* (2013.04); *B60C 2015/061* (2013.04)

(58) Field of Classification Search
CPC ........ B60C 13/00; B60C 13/001; B60C 13/02; B60C 13/023; B60C 17/00; B60C 17/04; B60C 17/08
See application file for complete search history.

(56) References Cited

U.S. PATENT DOCUMENTS 6,230,773 B1 * 5/2001 Sandstrom ............ B60C 1/0025
152/517
2009/0032161 A1   2/2009 Yamaguchi
(Continued)

FOREIGN PATENT DOCUMENTS

EP     2 277 719 A1    1/2011
GB       2138367    * 10/1984
(Continued)

OTHER PUBLICATIONS

International Search Report, mailed Jan. 8, 2013, issued in PCT/JP2012/071755.
(Continued)

*Primary Examiner* — Justin Fischer
(74) *Attorney, Agent, or Firm* — Birch, Stewart, Kolasch & Birch, LLP (57) ABSTRACT

[Object] To provide a pneumatic tire 82 which is excellent in durability.
[Solution] A tire 2 includes a tread 4, wings 6, sidewalls 8, clinch portions 10, beads 12, a carcass 14, support layers 16, a belt 18, a band 20, an inner liner 22, and chafers 24. Dimples 62 are formed on the sidewall 8 that is at an inner side in a width direction of a vehicle when the tire is mounted on the vehicle. No dimples 62 are formed on the sidewall 8 that is at an outer side in the width direction of the vehicle when the tire is mounted on the vehicle. The ratio (Ha/Hb) of a height Ha at an outer end 52, in a radial direction, of the bead 12 from a base line BL relative to a height Hb at a maximum width position $P_{max}$ from the base line is equal to or greater than 0.80 but equal to or less than 1.10.

4 Claims, 4 Drawing Sheets (51) Int. Cl.
  *B60C 17/04*   (2006.01)
  *B60C 17/08*   (2006.01)
  *B60C 15/00*   (2006.01)
  *B60C 17/00*   (2006.01)

(56)             References Cited

U.S. PATENT DOCUMENTS

2011/0030862 A1    2/2011  Hayashi et al.
2012/0145299 A1*   6/2012  Hino ..................... B60C 5/14
                                                     152/516

FOREIGN PATENT DOCUMENTS

| JP | 63-203406 A   |   | 8/1988  |
| JP | 6-166306 A    |   | 6/1994  |
| JP | 2003159912    | * | 6/2003  |
| JP | 2009-298397 A |   | 12/2009 |
| JP | 2010-260376 A |   | 11/2010 |
| JP | 2012-116382 A |   | 6/2012  |
| WO | WO 2007/032405 A1 |   | 3/2007 |
| WO | WO 2011/021466    | * | 2/2011 |

OTHER PUBLICATIONS

Written Opinion of the International Searching Authority, mailed Jan. 8, 2013, issued in PCT/JP2012/071755.

\* cited by examiner

RUN FLAT TIRE

TECHNICAL FIELD

The present invention relates to run flat tires. Specifically, the present invention relates to tires having dimples on side surfaces thereof.

BACKGROUND ART

In recent years, run flat tires including load support layers inside sidewalls have been developed and widespread. Highly hard crosslinked rubber is used for the support layers. Such run flat tires are called a side reinforcing type. In this type of a run flat tire, if the internal pressure is reduced due to puncture, a load is supported by the support layers. The support layers suppress flexure of the tire in a punctured state. Even if running is continued in the punctured state, the highly hard crosslinked rubber suppresses heat generation in the support layers. This run flat tire allows for running for some distance even in the punctured state. An automobile having such run flat tires mounted thereon need not be always equipped with a spare tire. The use of this run flat tire avoids change of a tire in an inconvenient place.

When running with the run flat tire in a punctured state is continued, deformation and restoration of the support layers are repeated. Due to the repetition, heat is generated in the support layers, and the temperature of the tire reaches a high temperature. The heat causes breakage of rubber components of the tire and separation among the rubber components of the tire. It is impossible to run with the tire in which the breakage and the separation have occurred. Run flat tires are desired which allow for running for a long period of time in a punctured state. In other words, run flat tires are desired in which breakage and separation due to heat are less likely to occur.

WO2007/032405 discloses a run flat tire having a large number of fins on sidewalls thereof. The surface area of the tire having the fins is large. The large surface area promotes release of heat from the tire to the atmosphere. In the tire, the temperature is less likely to rise.

JP2009-298397 discloses a run flat tire having a large number of dimples on sidewalls thereof. In the tire, turbulent flow is generated by the dimples. The turbulent flow promotes release of heat from the tire to the atmosphere. In the tire, the temperature is less likely to rise.

CITATION LIST

Patent Literature

Patent Literature 1: WO2007/032405
Patent Literature 2: JP2009-298397

SUMMARY OF THE INVENTION

Problems to be Solved by the Invention

The run flat tire disclosed in WO2007/032405, air resistance is generated due to the fins. The air resistance deteriorates fuel economy. In the tire, wind noise is generated at the fins. The tire is poor in silence. The fins constrain the design of the side surfaces of the tire.

In the tire disclosed in JP2009-298397, the thickness of a land which is a part other than the dimples is large. The weight of the tire having the land is high. The land deteriorates fuel economy. In the tire, wind noise is generated at the dimples. The tire is poor in silence. In addition, the dimples constrain the design of the side surfaces of the tire.

An object of the present invention is to provide a run flat tire which is excellent in silence, design, and durability in a punctured state and also has reduced air resistance.

Solution to the Problems

A run flat tire according to the present invention includes:
(1) a tread having an outer surface which forms a tread surface;
(2) a pair of sidewalls extending from ends, respectively, of the tread substantially inward in a radial direction;
(3) a pair of beads located substantially inward of the sidewalls, respectively, in the radial direction;
(4) a carcass extending along the tread and the sidewalls and on and between the beads;
(5) a reinforcing layer located inward of the tread and outward of the carcass in the radial direction; and
(6) a pair of load support layers located inward of the sidewalls, respectively, in an axial direction.
The tire has a lot of dimples on a side surface that is at an inner side in a width direction of a vehicle when the tire is mounted on the vehicle, of a pair of side surfaces of the tire. A number of the dimples is larger than a number of dimples present on the side surface that is at an outer side in the width direction of the vehicle when the tire is mounted on the vehicle.

Preferably, a ratio (Ha/Hb) of a height Ha at an outer end, in the radial direction, of the bead from a base line relative to a height Hb at a position of a maximum width from the base line is equal to or greater than 0.80 but equal to or less than 1.10.

A ratio (W/Ha) of a width W, in the radial direction, of a zone in which the dimples are formed, relative to a height Ha at an outer end, in the radial direction, of the bead from a base line, is equal to or greater than 0.60 but equal to or less than 1.20.

An automobile according to the present invention includes a vehicle and a run flat tire mounted on the vehicle. The tire has a lot of dimples on a side surface that is at an inner side in a width direction of the vehicle when the tire is mounted on the vehicle, of a pair of side surfaces of the tire. A number of these dimples is larger than a number of dimples present on the side surface that is at an outer side in the width direction of the vehicle when the tire is mounted on the vehicle.

Advantageous Effects of the Invention

In the run flat tire according to the present invention, the dimples achieve large surface areas of the side surfaces. The large surface areas promote release of heat from the tire to the atmosphere. In addition, the dimples generate turbulent flow around the tire. The turbulent flow promotes release of heat from the tire to the atmosphere. In the tire, the temperature is less likely to rise. In the tire, breakage of rubber components and separation among the rubber components which are caused due to heat are less likely to occur. The tire is excellent in durability.

In the tire, the dimples present on the side surface (hereinafter, referred to as "front-side side surface") that is at the outer side in the width direction of the vehicle when the tire is mounted on the vehicle, are small in number. Therefore, the degree of freedom in the design of the front-side side surface is high. Since the large number of dimples are present on the side surface (hereinafter, referred to as "back-side side surface") that is at the inner side in the width direction of the vehicle, the degree of freedom in the design of the back-side side surface is low. However, the back-side side surface is hidden in a body of the vehicle, and thus the dimples thereon do not impair the appearance of the tire.

In the tire, since the dimples present on the front-side side surface are small in number, air resistance is not generated at the front-side side surface due to the dimples. The tire can contribute to reduction in fuel consumption. At the front-side side surface, wind noise is not generated due to the dimples. The tire is excellent in silence.

DESCRIPTION OF EMBODIMENTS

The following will describe in detail the present invention based on preferred embodiments with appropriate reference to the drawings.

Figure 1:
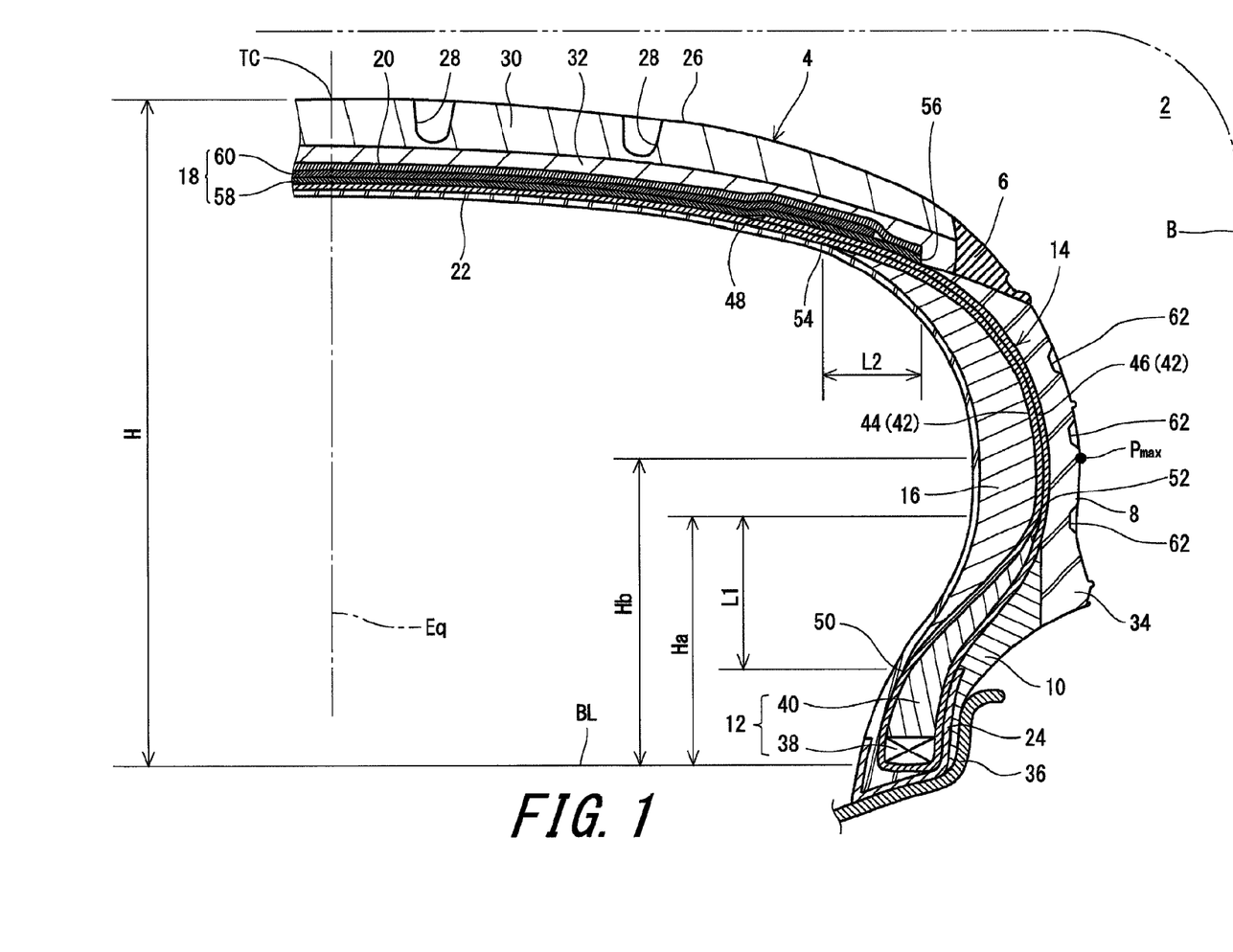
FIG. 1 is a cross-sectional view showing a portion of a run flat tire according to one embodiment of the present invention together with a body of a vehicle.
Figure 2:
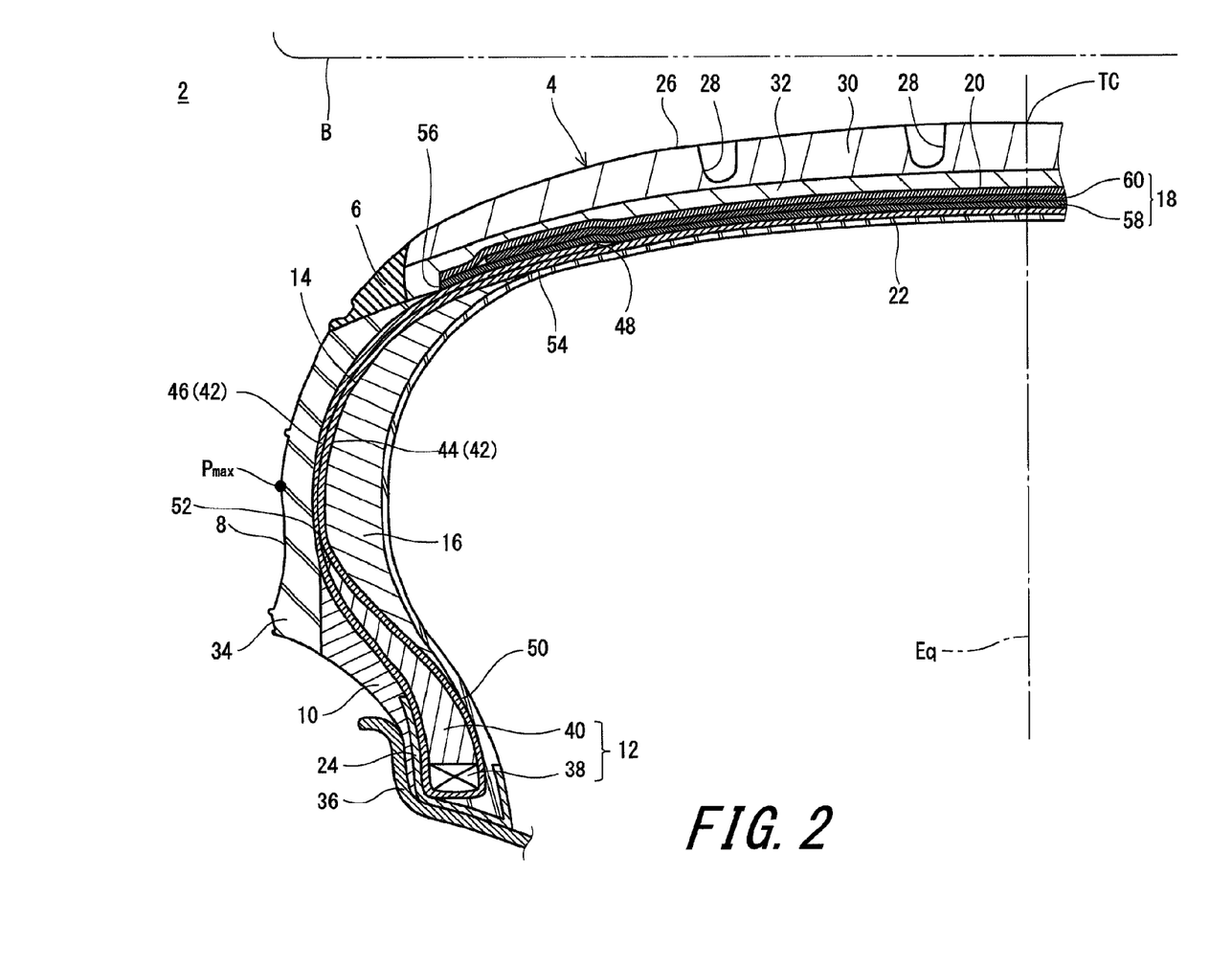
FIG. 2 is a cross-sectional view showing a portion of the tire in FIG. 1 together with the body of the vehicle.

FIGS. 1 and 2 show a run flat tire 2 together with a body B of a vehicle of an automobile. In FIGS. 1 and 2, the up-down direction is the radial direction of the tire 2, the right-left direction is the axial direction of the tire 2, and the direction perpendicular to the surface of the sheet is the circumferential direction of the tire 2. The right-left direction is also the width direction of the vehicle. The right side is the inner side in the width direction of the vehicle, and the left side is the outer side in the width direction of the vehicle. In FIGS. 1 and 2, an alternate long and short dash line Eq represents the equator plane of the tire 2. In FIG. 1, an arrow H represents the height of the tire 2 from a base line BL (described in detail later).

The tire 2 includes a tread 4, wings 6, sidewalls 8, clinch portions 10, beads 12, a carcass 14, load support layers 16, a belt 18, a band 20, an inner liner 22, and chafers 24. The belt 18 and the band 20 form a reinforcing layer. The reinforcing layer may be composed of the belt 18 only. The reinforcing layer may be composed of the band 20 only.

The tread 4 has a shape projecting outward in the radial direction. The tread 4 forms a tread surface 26 which is brought into contact with a road surface. Grooves 28 are formed on the tread surface 26. A tread pattern is formed by the grooves 28. The tread 4 includes a cap layer 30 and a base layer 32. The cap layer 30 is formed from a crosslinked rubber. The base layer 32 is formed from another crosslinked rubber. The cap layer 30 is located outward of the base layer 32 in the radial direction. The cap layer 30 is laminated on the base layer 32.

The sidewalls 8 extend from the ends of the tread 4 substantially inward in the radial direction. The sidewalls 8 are formed from a crosslinked rubber. The sidewalls 8 prevent injury of the carcass 14. The sidewalls 8 include ribs 34. The ribs 34 project outward in the axial direction. During running in a punctured state, the ribs 34 abut against flanges 36 of a rim. The abutment allows deformation of the beads 12 to be suppressed. The tire 2 in which the deformation is suppressed is excellent in durability in a punctured state.

The clinch portions 10 are located substantially inward of the sidewalls 8 in the radial direction. The clinch portions 10 are located outward of the beads 12 and the carcass 14 in the axial direction. The clinch portions 10 abut against the flanges 36 of the rim.

The beads 12 are located inward of the sidewalls 8 in the radial direction. Each bead 12 includes a core 38 and an apex 40 extending from the core 38 outward in the radial direction. The core 38 has a ring shape and includes a non-stretchable wound wire (typically, a steel wire). The apex 40 is tapered outward in the radial direction. The apex 40 is formed from a highly hard crosslinked rubber.

In FIG. 1, an arrow Ha indicates the height of the apex 40 from the base line BL. In other words, the height Ha is the height at an outer end, in the radial direction, of the bead from the base line. The base line BL passes through an innermost point, in the radial direction, on the core 38. The base line BL extends in the axial direction. The ratio (Ha/H) of the height Ha of the apex 40 to the height H of the tire 2 is preferably equal to or greater than 0.1 and preferably equal to or less than 0.7. The apex 40 having a ratio (Ha/H) of 0.1 or greater can support the weight of the vehicle in a punctured state. The apex 40 contributes to durability of the tire 2 in a punctured state. In this respect, the ratio (Ha/H) is more preferably equal to or greater than 0.2. The tire 2 having a ratio (Ha/H) of 0.7 or less is excellent in ride comfort. In this respect, the ratio (Ha/H) is more preferably equal to or less than 0.6.

In FIG. 1, an arrow Hb indicates the height at a position $P_{max}$ of a maximum width from the base line BL. The ratio (Ha/Hb) of the height Ha to the height Hb is preferably equal to or greater than 0.8. The stiffness of each side portion of the tire 2 in which the ratio is equal to or greater than 0.8 is high. In the tire 2, deformation of each side portion relative to the rim flange as a fulcrum at the time of puncture is suppressed. The tire 2 is excellent in durability in a punctured state. In this respect, the ratio is more preferably equal to or greater than 0.85 and particularly preferably equal to or greater than 0.90. In light of ride comfort in a normal state (a state where the tire 2 is inflated to a normal internal pressure), the ratio is preferably equal to or less than 1.10.

The carcass 14 is formed of a carcass ply 42. The carcass ply 42 extends on and between the beads 12 on both sides, and extends along the tread 4 and the sidewalls 8. The carcass ply 42 is turned up around each core 38 from the inner side to the outer side in the axial direction. Due to this turning-up, a main portion 44 and turned-up portions 46 are formed in the carcass ply 42. Ends 48 of the turned-up portions 46 are located immediately below the belt 18. In other words, each turned-up portion 46 overlaps the belt 18. The carcass 14 has a so-called "ultra-highly turned-up structure". The carcass 14 having the ultra-highly turned-up structure contributes to durability of the tire 2 in a punctured state.

The carcass ply 42 includes a large number of cords aligned with each other, and a topping rubber. The absolute value of the angle of each cord relative to the equator plane is 45° to 90° and more preferably 75° to 90°. In other words, the carcass 14 has a radial structure. The cords are formed from an organic fiber. Examples of preferable organic fibers include polyester fibers, nylon fibers, rayon fibers, polyethylene naphthalate fibers, and aramid fibers.

The load support layers 16 are located inward of the sidewalls 8 in the axial direction. Each support layer 16 is interposed between the carcass 14 and the inner liner 22. The support layers 16 are tapered inward and outward in the radial direction. Each support layer 16 has a crescent-like shape. The support layers 16 are formed from a highly hard crosslinked rubber. When the tire 2 is punctured, the support layers 16 support a load. The support layers 16 allow for running for some distance with the tire 2 even in a punctured state. The run flat tire 2 is of a side reinforcing type. The tire 2 may include support layers each having a shape different from the shape of the support layer 16 shown in FIGS. 1 and 2.

Portions of the carcass 14 which overlap the support layers 16 are separated from the inner liner 22. In other words, the carcass 14 is bent due to the presence of the support layers 16. In a punctured state, a compressive load is applied to the support layers 16, and a tensile load is applied to regions of the carcass 14 which are near the support layers 16. Each support layer 16 is a lump of rubber and can sufficiently bear the compressive load. The cords of the carcass 14 can sufficiently bear the tensile load. The support layers 16 and the carcass cords suppress vertical flexure of the tire 2 in the punctured state. The tire 2 of which vertical flexure is suppressed is excellent in handling stability in a punctured state.

In light of suppression of vertical distortion in a punctured state, the hardness of each support layer 16 is preferably equal to or greater than 60 and more preferably equal to or greater than 65. In light of ride comfort in a normal state, the hardness is preferably equal to or less than 90 and more preferably equal to or less than 80. The hardness is measured according to the standard of "JIS K6253" with a type A durometer. The hardness is measured by pressing the durometer against the cross section shown in FIGS. 1 and 2. The measurement is performed at a temperature of 23° C.

Lower ends 50 of the support layers 16 are located inward of upper ends 52 of the apexes 40 (i.e., outer ends, in the radial direction, of the beads) in the radial direction. In other words, the support layers 16 overlap the apexes 40. In FIG. 1, an arrow L1 indicates the distance in the radial direction between the lower end 50 of each support layer 16 and the upper end 52 of the corresponding apex 40. The distance L1 is preferably equal to or greater than 5 mm and preferably equal to or less than 50 mm. In the tire 2 in which the distance L1 is within this range, a uniform stiffness distribution is obtained. The distance L1 is more preferably equal to or greater than 10 mm. The distance L1 is more preferably equal to or less than 40 mm.

Upper ends 54 of the support layers 16 are located inward of ends 56 of the belt 18 in the axial direction. In other words, the support layers 16 overlap the belt 18. In FIG. 1, an arrow L2 indicates the distance in the axial direction between the upper end 54 of each support layer 16 and the corresponding end 56 of the belt 18. The distance L2 is preferably equal to or greater than 2 mm and preferably equal to or less than 50 mm. In the tire 2 in which the distance L2 is within this range, a uniform stiffness distribution is obtained. The distance L2 is more preferably equal to or greater than 5 mm. The distance L2 is more preferably equal to or less than 40 mm.

In light of suppression of vertical distortion in a punctured state, the maximum thickness of each support layer 16 is preferably equal to or greater than 3 mm, more preferably equal to or greater than 4 mm, and particularly preferably equal to or greater than 7 mm. In light of reduction in the weight of the tire 2, the maximum thickness is preferably equal to or less than 25 mm and more preferably equal to or less than 20 mm.

The belt 18 is located outward of the carcass 14 in the radial direction. The belt 18 is laminated on the carcass 14. The belt 18 reinforces the carcass 14. The belt 18 includes an inner layer 58 and an outer layer 60. As is obvious from FIGS. 1 and 2, the width of the inner layer 58 is slightly greater than the width of the outer layer 60. Each of the inner layer 58 and the outer layer 60 includes a large number of cords aligned with each other, and a topping rubber, which are not shown. Each cord is tilted relative to the equator plane. Normally, the absolute value of the tilt angle is equal to or greater than 10° but equal to or less than 35°. The direction in which each cord of the inner layer 58 is tilted relative to the equator plane is opposite to the direction in which each cord of the outer layer 60 is tilted relative to the equator plane. The material of the cords is preferably steel. An organic fiber may be used for the cords. The width, in the axial direction, of the belt 18 is preferably equal to or greater than 0.85 times of the maximum width of the tire 2 and preferably equal to or less than 1.0 time of the maximum width of the tire 2. The belt 18 may include three or more layers.

The band 20 covers the belt 18. The band 20 includes a cord and a topping rubber, which are not shown. The cord is helically wound. The band 20 has a so-called jointless structure. The cord extends substantially in the circumferential direction. The angle of the cord relative to the circumferential direction is equal to or less than 5° and further equal to or less than 2°. The belt 18 is secured by the cord, so that lifting of the belt 18 is suppressed. The cord is formed from an organic fiber. Examples of preferable organic fibers include nylon fibers, polyester fibers, rayon fibers, polyethylene naphthalate fibers, and aramid fibers.

The tire 2 may include, instead of the band 20, edge bands which cover only the vicinities of the ends 56 of the belt 18. The tire 2 may include both the band 20 and the edge bands.

The inner liner 22 is bonded to the inner peripheral surface of the carcass 14. The inner liner 22 is formed from a crosslinked rubber. A rubber that has an excellent air blocking property is used for the inner liner 22. The inner liner 22 maintains the internal pressure of the tire 2.

As shown in FIG. 1, the tire 2 has a large number of dimples 62 on a back-side side surface thereof. As shown in FIG. 2, the tire 2 does not have any dimples 62 on a front-side side surface thereof. In the present invention, the side surfaces mean regions of the outer surfaces of the tire 2 that can be viewed in the axial direction. Typically, the dimples 62 are formed on the surface of the sidewall 8 at the back-side side surface.

Figure 3:
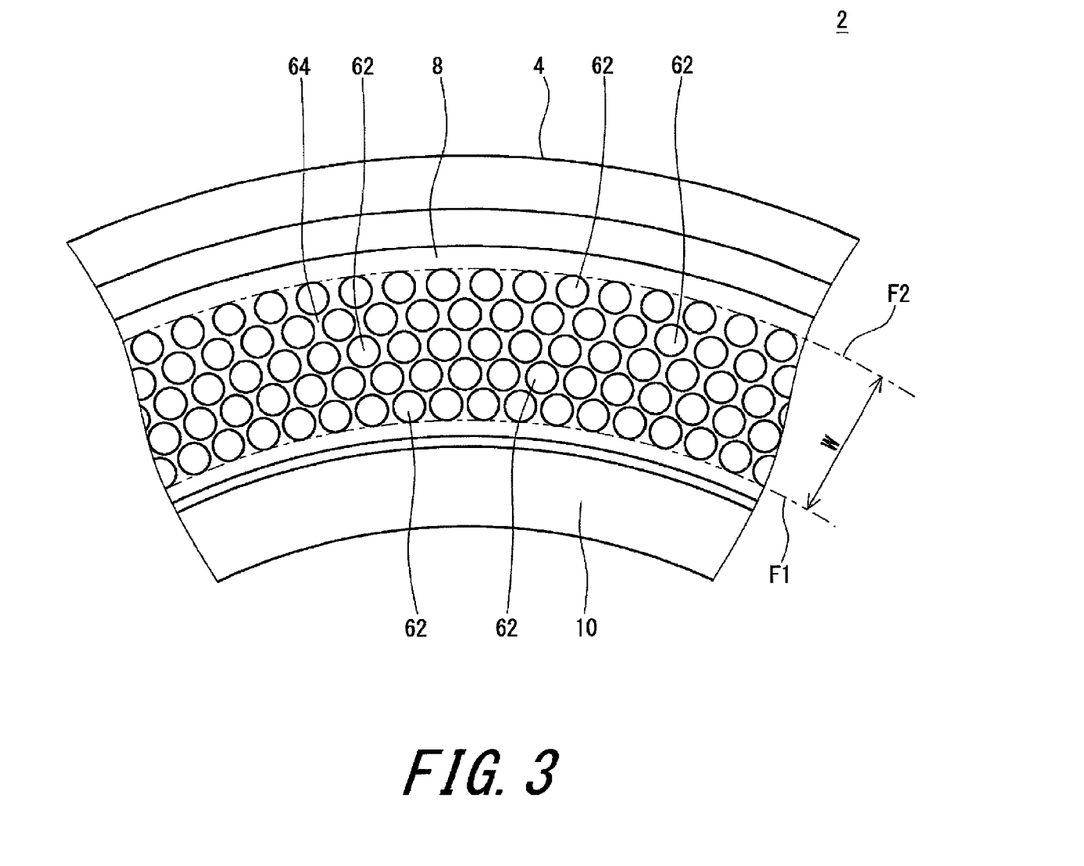
FIG. 3 is a front view showing a portion of a back-side side surface of the tire in FIG. 1.

FIG. 3 is a front view showing the back-side side surface of the tire 2 in FIG. 1. The large number of dimples 62 are present on the surface of the sidewall 8 at the back-side side surface. These dimples 62 are present in a zone surrounded by a virtual circle F1 and a virtual circle F2. In FIG. 3, an arrow W indicates the distance in the radial direction between the virtual circle F1 and the virtual circle F2. In other words, the arrow W indicates the width, in the radial direction, of the zone in which the dimples 62 are present. Of the side surface, a part other than the dimples is a land 64.

The surface area of the side surface having the dimples 62 is larger than the surface area of the side surface when it is postulated that no dimples 62 exist thereon. The area of contact between the tire 2 and the atmosphere is large. The large area of contact promotes release of heat from the tire 2 to the atmosphere. In addition, the dimples 62 generate turbulent flow around the tire 2. The turbulent flow promotes release of heat from the tire 2 to the atmosphere.

When running with the tire 2 is continued in a punctured state, deformation and restoration of the support layers 16 are repeated. Due to the repetition, heat is generated in the support layers 16. As described above, the dimples 62 promote release of heat to the atmosphere. In the tire 2, breakage of rubber components and separation among the rubber components which are caused due to heat are suppressed. The tire 2 allows for running for a long period of time in a punctured state. The dimples 62 contribute to heat release not only in a punctured state but also in a normal state. The dimples 62 also contribute to durability of the tire 2 in a normal state. Running in a state where the internal pressure is less than a normal value may be inadvertently caused by a driver. The dimples 62 can also contribute to durability in this case.

In light of heat release efficiency, the ratio (W/Ha) of the width W (see FIG. 3) to the height Ha (see FIG. 1) is preferably equal to or greater than 0.60, more preferably equal to or greater than 0.75, and particularly preferably equal to or greater than 0.90. In light of ease of production, the ratio is preferably equal to or less than 1.2.

In light of heat release efficiency, the outer end 52, in the radial direction, of the bead 12 is preferably located between the virtual circles F1 and F2 (see FIG. 3) in the radial direction. Ideally, the outer end 52 is located at the midpoint between the virtual circles F1 and F2 in the radial direction. Instead of the dimples 62 located between the virtual circles F1 and F2, or together with these dimples, the tire may have dimples which are present on a buttress.

In the tire 2, temperature rise is suppressed by the dimples 62. Thus, even when the support layers 16 are thin, running in a punctured state for a long period of time is possible. The thin support layers 16 achieve reduction in the weight of the tire 2. The thin support layers 16 reduce rolling resistance. The tire 2 which is lightweight and has reduced rolling resistance contributes to reduction in the fuel consumption of the vehicle. Furthermore, the thin support layers 16 also achieve excellent ride comfort.

As a result of examination regarding a camber angle during running with a side reinforcing type run flat tire in a punctured state, the present inventor has found that the camber is so-called negative camber. The present inventor also has found that due to the negative camber, the temperature of the back-side side surface during running is higher than the temperature of the front-side side surface. As a result of observation of the tire after running by the present inventor, the support layer at the back-side side surface has been broken, but the support layer at the front-side side surface has not been broken. On the basis of these findings, the present inventor has conceived of a run flat tire 2 in which dimples 62 are present only on a back-side side surface thereof. In the tire 2, the dimples 62 suppress temperature rise of the back-side side surface. Although the effect of suppressing temperature rise by the dimples 62 is not obtained at the front-side side surface, breakage of the tire 2 is less likely to occur since the degree of temperature rise of the front-side side surface is basically low.

A brand name, a size, and the like are indicated on the side surfaces. Since no dimples 62 are present on the front-side side surface, the brand name, the size, and the like can be indicated on the front-side side surface without being constrained by the dimples 62. At the front-side side surface, impairment of appearance does not occur due to the dimples 62. The back-side side surface is not viewed, and thus the dimples 62 on the back-side side surface do not have an adverse effect on the appearance of the tire 2.

Since no dimples 62 are present on the front-side side surface, the air resistance of the tire 2 is low. The tire 2 can achieve reduction in the fuel consumption of the vehicle. Furthermore, since no dimples 62 are present on the front-side side surface, the wind noise of the tire 2 is low. The tire 2 is excellent in silence.

Both the back-side side surface and the front-side side surface may have dimples 62. In this case, the number of the dimples 62 on the front-side side surface is set so as to be less than that on the back-side side surface. The ratio of the number N1 of the dimples 62 on the front-side side surface to the number N2 of the dimples 62 on the back-side side surface is preferably equal to or less than 70%, more preferably equal to or less than 50%, and particularly preferably equal to or less than 30%. Ideally, the ratio is 0%. In the tire 2 shown in FIGS. 1 to 3, the ratio is 0%.

Figure 4A:
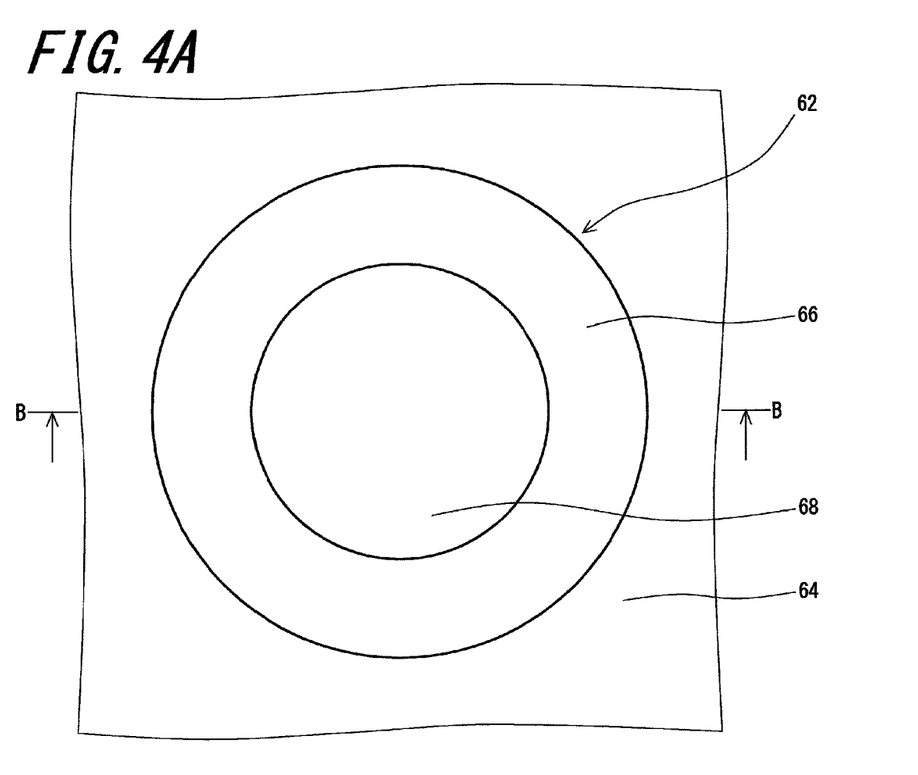
FIG. 4A is an enlarged plan view showing a dimple of the tire 2 in FIG. 1.
Figure 4B:
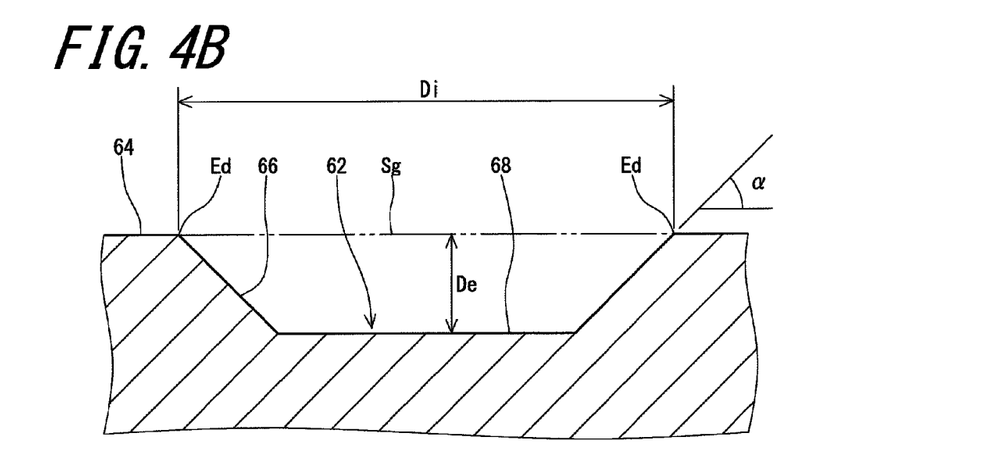
FIG. 4B is a cross-sectional view taken along a line-B-B in FIG. 4A.

FIG. 4A is an enlarged plan view showing the dimple 62 of the tire 2 in FIG. 1, and FIG. 4B is a cross-sectional view taken along a line B-B in FIG. 4A. The contour of the dimple 62 is a circle. The dimple 62 has a slope surface 66 and a bottom surface 68. The slope surface 66 is connected to the land 64. The slope surface 66 is annular. The slope surface 66 is tilted relative to the land 64. The contour of the slope surface 66 is a circle. The width of the slope surface 66 is uniform. Therefore, the circle that is the contour of the bottom surface 68 is concentric with the circle that is the contour of the dimple 62.

In FIG. 4B, an alternate long and two short dashes line Sg is a line segment extending from one edge Ed of the dimple 62 to another edge Ed of the dimple 62. In FIG. 4, an arrow Di indicates the length of the line segment Sg, that is, the diameter of the dimple 62. The diameter Di is preferably equal to or greater than 2 mm and preferably equal to or less than 70 mm. Air sufficiently flows into the dimple 62 having a diameter Di of 2 mm or greater, and thus turbulent flow is sufficiently generated. The dimple 62 suppresses temperature rise of the tire 2. In this respect, the diameter Di is more preferably equal to or greater than 4 mm and particularly preferably equal to or greater than 6 mm. In the tire 2 having the dimples 62 having a diameter Di of 70 mm or less, turbulent flow can be generated at a large number of locations. Furthermore, in the tire 2 having the dimples 62 having a diameter Di of 70 mm or less, the surface area of each side surface is large. The large surface area promotes release of heat from the tire 2. The dimples 62 suppress temperature rise of the tire 2. In this respect, the diameter Di is more preferably equal to or less than 40 mm and particularly preferably equal to or less than 20 mm.

The tire 2 may have two or more types of dimples 62 having diameters Di different from each other. In the tire 2 having the two or more types of the dimples 62, the average diameter of the dimples 62 is preferably 2 mm, more preferably equal to or greater than 4 mm, and particularly preferably equal to or greater than 6 mm. The average diameter is preferably equal to or less than 70 mm, more preferably equal to or less than 40 mm, and particularly preferably equal to or less than 20 mm. The ratio of the number of the dimples 62 whose diameters Di are within the above range, relative to the total number of the dimples 62, is preferably equal to or greater than 50% and more preferably equal to or greater than 70%. The ratio is ideally 100%.

In FIG. 4, an arrow De indicates the depth of the dimple 62. The depth De is the distance between the deepest portion of the dimple 62 and the line segment Sg. The depth De is preferably equal to or greater than 0.5 mm and preferably equal to or less than 7 mm. At the dimple 62 having a depth De of 0.5 mm or greater, sufficient turbulent flow is generated. In this respect, the depth De is more preferably equal to or greater than 0.8 mm and particularly preferably equal to or greater than 1.0 mm. In the dimple 62 having a depth De of 7 mm or less, air is less likely to stay at its bottom. In this respect, the depth De is more preferably equal to or less than 4.0 mm and particularly preferably equal to or less than 3.0 mm.

The tire 2 may have two or more types of dimples 62 having depths De different from each other. In the tire 2 having the two or more types of the dimples 62, the average depth of the dimples 62 is preferably equal to or greater than 0.5 mm, more preferably equal to or greater than 0.8 mm, and particularly preferably equal to or greater than 1.0 mm. The average depth is preferably equal to or less than 7 mm, more preferably equal to or less than 4.0 mm, and particularly preferably equal to or less than 3.0 mm. The ratio of the number of the dimples 62 whose depths De are within the above range, relative to the total number of the dimples 62, is preferably equal to or greater than 50% and more preferably equal to or greater than 70%. The ratio is ideally 100%.

The ratio (De/Di) of the depth De to the diameter Di is preferably equal to or greater than 0.01 and preferably equal to or less than 0.5. At the dimple 62 having a ratio (De/Di) of 0.01 or greater, sufficient turbulent flow is generated. In this respect, the ratio (De/Di) is more preferably equal to or greater than 0.03 and particularly preferably equal to or greater than 0.05. In the dimple 62 having a ratio (De/Di) of 0.5 or less, air is less likely to stay at its bottom. In this respect, the ratio (De/Di) is more preferably equal to or less than 0.4 and particularly preferably equal to or less than 0.3.

The volume of the dimple 62 is preferably equal to or greater than 1.0 mm³ and preferably equal to or less than 400 mm³. At the dimple 62 having a volume of 1.0 mm³ or greater, sufficient turbulent flow is generated. In this respect, the volume is more preferably equal to or greater than 1.5 mm³ and particularly preferably equal to or greater than 2.0 mm³. In the dimple 62 having a volume of 400 mm³ or less, air is less likely to stay at its bottom. In this respect, the volume is more preferably equal to or less than 300 mm³ and particularly preferably equal to or less than 250 mm³.

The sum of the volumes of all the dimples 62 on the back-side side surface is preferably equal to or greater than 300 mm³ and preferably equal to or less than 5000000 mm³. In the tire 2 in which the sum is equal to or greater than 300 mm³, heat is sufficiently released. In this respect, the sum is more preferably equal to or greater than 600 mm³ and particularly preferably equal to or greater than 800 mm³. The tire 2 in which the sum is equal to or less than 5000000 mm³ is lightweight. In this respect, the sum is more preferably equal to or less than 1000000 mm³ and particularly preferably equal to or less than 500000 mm³.

The area of the dimple 62 is preferably equal to or greater than 3 mm² and preferably equal to or less than 4000 mm². At the dimple 62 having an area of 3 mm² or greater, sufficient turbulent flow is generated. In this respect, the area is more preferably equal to or greater than 12 mm² and particularly preferably equal to or greater than 20 mm². The tire 2 in which the area of each dimple 62 is equal to or less than 4000 mm² is lightweight. In this respect, the area is more preferably equal to or less than 2000 mm² and particularly preferably equal to or less than 1300 mm². In the present invention, the area of the dimple 62 means the area of a region surrounded by the contour of the dimple 62. In the case of a circular dimple 62, the area S is calculated by the following mathematical formula.

$$S = (Di/2)^2 * \pi$$

The width of the land 64 between the adjacent dimples 62 is preferably equal to or greater than 0.05 mm and preferably equal to or less than 20 mm. In the tire 2 in which the width is equal to or greater than 0.05 mm, the land 64 has sufficient wear resistance. In this respect, the width is more preferably equal to or greater than 0.10 mm and particularly preferably equal to or greater than 0.2 mm. In the tire 2 in which the width is equal to or less than 20 mm, turbulent flow can be generated at a large number of locations. In this respect, the width is more preferably equal to or less than 15 mm and particularly preferably equal to or less than 10 mm.

The number of the dimples 62 on the back-side side surface is preferably equal to or greater than 50 and preferably equal to or less than 5000. In the tire 2 in which the number is equal to or greater than 50, turbulent flow can be generated at a large number of locations. In this respect, the number is more preferably equal to or greater than 100 and particularly preferably equal to or greater than 150. In the tire 2 in which the number is equal to or less than 5000, each dimple 62 can have a sufficient size. In this respect, the number is more preferably equal to or less than 2000 and particularly preferably equal to or less than 1000. The number and pattern of the dimples 62 can be determined as appropriate in accordance with the size of the tire 2 and the area of each side portion.

Since the tire 2 rotates, the flow direction of air relative to each dimple 62 is not uniform. Therefore, for the tire 2, dimples 62 having no directionality, namely, dimples 62 whose plane shapes are circles, are most preferred. In consideration of the rotating direction of the tire 2, dimples 62 having directionality may be arranged.

In the present invention, the "dimple" is clearly distinguishable from a groove seen in an existing tire. A groove has a large length relative to its width. In a tire having a groove, air is likely to stay. Meanwhile, each dimple 62 has a low ratio of its long diameter to its short diameter. Therefore, in the tire 2 having the dimples 62, air is less likely to stay. The ratio of the long diameter to the short diameter is preferably equal to or less than 3.0, more preferably equal to or less than 2.0, and particularly preferably equal to or less than 1.5. In each circular dimple 62, the ratio is 1.0. The long diameter is the length of a longest line segment that can be drawn within the contour when the dimple 62 is viewed at infinity. The short diameter is the size of the dimple 62 in a direction orthogonal to the longest line segment.

As shown in FIG. 1, in the tire 2, the large number of dimples 62 are arranged in a staggered manner. Therefore, six dimples 62 are adjacent to one dimple 62. In the tire 2 having this arrangement, locations where turbulent flow is generated are uniformly distributed. In the tire 2, heat is uniformly released from each side surface. The arrangement is excellent in a cooling effect. The large number of dimples 62 may be arranged randomly.

As shown in FIG. 4, a cross-sectional shape of the dimple 62 is a trapezoid. In other words, the shape of the dimple 62 is a circular truncated cone. In the dimple 62, the volume is large with respect to the depth De. Therefore, both a sufficient volume and a small depth De can be achieved. When a small depth De is set, staying of air can be suppressed.

In FIG. 4, a reference sign α indicates an angle of the slope surface 66. The angle α is preferably equal to or greater than 10° and preferably equal to or less than 70°. In the dimple 62 having an angle α of 10° or greater, both a sufficient volume and a small depth De can be achieved. In this respect, the angle α is more preferably equal to or greater than 20° and particularly preferably equal to or greater than 25°. In the dimple 62 having an angle α of 70° or less, turbulent flow easily flows in to the bottom surface 68. In this respect, the angle is more preferably equal to or less than 60° and particularly preferably equal to or less than 55°.

The tire 2 may have non-circular dimples instead of the circular dimples 62 or together with the circular dimples 62. Plane shapes of typical non-circular dimples are polygons. The tire 2 may have dimples whose plane shapes are ellipses or elongated circles. The tire 2 may have dimples whose plane shapes are tear shapes (teardrop type). The tire 2 may have projections together with the dimples 62. The tire 2 may have fins together with the dimples 62.

The dimples 62 exert their effects in tires of various sizes. In the case of a tire for passenger car, the dimples 62 exert their effects when the width of the tire is equal to or greater than 100 mm but equal to or less than 350 mm, the aspect ratio of the tire is equal to or greater than 30% but equal to or less than 100%, and the diameter of the rim is equal to or greater than 10 inches but equal to or less than 25 inches.

In production of the tire 2, a plurality of rubber components are assembled to obtain a raw cover (unvulcanized tire). The raw cover is put into a mold. The outer surface of the raw cover abuts against the cavity surface of the mold. The inner surface of the raw cover abuts against a bladder or a core. The raw cover is pressurized and heated in the mold. The rubber composition in the raw cover flows due to the pressurization and the heating. Cross-linking reaction is caused in the rubber due to the heating, to obtain the tire 2. The dimples 62 are formed in the tire 2 by using a mold having pimples on a cavity surface thereof. The shapes of the dimples 62 are shapes that are the inverted shapes of the pimples.

The tire 2 is mounted on the automobile such that the side surface thereof having the dimples 62 becomes a back surface. When the tire 2 mounted at the right side of the automobile is rotated to the left side of the automobile, the rotating direction of the tire 2 is reversed.

The dimensions and angles of each component of the tire are measured in a state where the tire is mounted on a normal rim and inflated to a normal internal pressure, unless otherwise specified. During the measurement, no load is applied to the tire. In the present specification, the normal rim means a rim specified in a standard on which the tire is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire for passenger car, the dimensions and angles are measured in a state where the internal pressure is 180 kPa.

EXAMPLES

The following will show effects of the present invention by means of examples, but the present invention should not be construed in a limited manner based on the description of these examples.

Example 1

A run flat tire including load support layers was produced. The specifications of the tire are as follows.

Size: 235/55R18 99H
Height Ha at the outer end, in the radial direction, of the bead: 62 mm
Height Hb at the position $P_{max}$ of the maximum width W: 62 mm
Width W of the zone in which dimples are formed: 62 mm
The tire does not have any dimples on a front-side side surface thereof, and has 300 dimples on a back-side side surface thereof. The contour of each dimple is a circle. The specifications of each dimple are as follows.
Diameter Di: 8.0 mm
Depth De: 2.0 mm Example 2 and Comparative Examples 1 and 2

Tires of Example 2 and Comparative Examples 1 and 2 were obtained in the same manner as Example 1, except the number of the dimples was as shown in Table 1 below.

Comparative Example 3

A tire of Comparative Example 3 was obtained in the same manner as Example 1, except no dimples were provided.

Examples 3 to 6

Tires of Examples 3 to 6 were obtained in the same manner as Example 1, except the sizes of the dimples were changed to have the width W as shown in Table 2 below.

Examples 7 to 10

Tires of Examples 7 to 10 were obtained in the same manner as Example 1, except the height Ha at the outer end, in the radial direction, of the bead was as shown in Table 3 below.

[Weight]
The weight of each tire was measured. The results are shown as indexes in Tables 1 to 3 below. A lower value indicates a better result.

[Vertical Stiffness Constant]
Each tire was mounted on a normal rim and inflated such that the internal pressure thereof became 220 kPa. A load which is 80% of the maximum applied load specified in the JATMA standard was applied to the tire, and a vertical stiffness constant was measured. The results are shown as indexes in Tables 1 to 3 below. A lower value indicates a better result.

[Durability]
Each tire was mounted on a normal rim and inflated such that the internal pressure thereof became 220 kPa. The tire was mounted on the left rear wheel of a front-engine rear-wheel-drive passenger car having an engine displacement of 4300 cc. A valve core of the tire was removed to cause the inside of the tire to communicate with the atmosphere. Tires each having an internal pressure of 220 kPa were mounted on the left front wheel, the right front wheel, and the right rear wheel of the passenger car. A driver was caused to drive this passenger car on a test course at a speed of 80 km/h. A running distance was measured until the tire was broken. The results are shown as indexes in Tables 1 to 3 below. A higher value indicates a better result.

[Wind Noise]
Each tire was mounted on a normal rim and inflated such that the internal pressure thereof became 220 kPa. The tires were mounted on a front-engine rear-wheel-drive passenger car having an engine displacement of 4300 cc. A driver was caused to drive this passenger car on a test course at a speed of 80 km/h and to evaluate wind noise. The results are shown as indexes in Tables 1 to 3 below. A lower value indicates a better result.

[Air Resistance]

Each tire was mounted on a normal rim and inflated such that the internal pressure thereof became 220 kPa. The tires were mounted on a front-engine rear-wheel-drive passenger car having an engine displacement of 4300 cc. This passenger car was subjected to a coasting test, and a deceleration was measured. The results are shown as indexes in Tables 1 to 3 below. A lower value indicates a better result.

[Degree of Freedom in Design]

The degree of freedom in the design of the front-side side surface was categorized based on the following criteria.
A: Degree of freedom is high.
B: Degree of freedom is slightly low.
C: Degree of freedom is low.
The results are shown in Tables 1 to 3 below.

TABLE 1

Results of Evaluation

|  |  | Example 1 | Example 2 | Comparative Example 1 | Comparative Example 2 | Comparative Example 3 |
|---|---|---|---|---|---|---|
| Number of dimples | Front side | 0 | 150 | 300 | 300 | 0 |
|  | Back side | 300 | 300 | 300 | 0 | 0 |
| Ha (mm) |  | 62 | 62 | 62 | 62 | 62 |
| Hb (mm) |  | 62 | 62 | 62 | 62 | 62 |
| Ha/Hb |  | 1.00 | 1.00 | 1.00 | 1.00 | 1.00 |
| W (mm) |  | 62 | 62 | 62 | 62 | — |
| W/Ha |  | 1.00 | 1.00 | 1.00 | 1.00 | — |
| Weight |  | 100 | 100 | 100 | 100 | 100 |
| Vertical stiffness constant |  | 100 | 100 | 100 | 100 | 100 |
| Durability |  | 120 | 122 | 122 | 102 | 100 |
| Wind noise |  | 100 | 107 | 108 | 108 | 100 |
| Air resistance |  | 100 | 107 | 108 | 108 | 100 |
| Degree of freedom in design |  | A | B | C | C | A |

TABLE 2

Results of Evaluation

|  |  | Example 3 | Example 4 | Example 5 | Example 6 |
|---|---|---|---|---|---|
| Number of dimples | Front side | 0 | 0 | 0 | 0 |
|  | Back side | 300 | 300 | 300 | 300 |
| Ha (mm) |  | 62 | 62 | 62 | 62 |
| Hb (mm) |  | 62 | 62 | 62 | 62 |
| Ha/Hb |  | 1.00 | 1.00 | 1.00 | 1.00 |
| W (mm) |  | 25 | 37 | 74 | 81 |
| W/Ha |  | 0.40 | 0.60 | 1.19 | 1.31 |
| Weight |  | 99 | 98 | 96 | 95 |
| Vertical stiffness constant |  | 100 | 100 | 100 | 100 |
| Durability |  | 116 | 118 | 128 | 130 |
| Wind noise |  | 100 | 100 | 100 | 102 |
| Air resistance |  | 100 | 100 | 100 | 102 |
| Degree of freedom in design |  | A | A | A | A |

TABLE 3

Results of Evaluation

|  |  | Example 7 | Example 8 | Example 9 | Example 10 |
|---|---|---|---|---|---|
| Number of dimples | Front side | 0 | 0 | 0 | 0 |
|  | Back side | 300 | 300 | 300 | 300 |

TABLE 3-continued

Results of Evaluation

|  | Example 7 | Example 8 | Example 9 | Example 10 |
|---|---|---|---|---|
| Ha (mm) | 37 | 50 | 68 | 75 |
| Hb (mm) | 62 | 62 | 62 | 62 |
| Ha/Hb | 0.60 | 0.80 | 1.10 | 1.21 |
| W (mm) | 62 | 62 | 62 | 62 |
| Weight | 92 | 99 | 101 | 102 |
| Vertical stiffness constant | 94 | 100 | 102 | 105 |
| Durability | 97 | 118 | 121 | 122 |
| Wind noise | 100 | 100 | 100 | 100 |
| Air resistance | 100 | 100 | 100 | 100 |
| Degree of freedom in design | A | A | A | A |

As shown in Tables 1 to 3, the tire of each Example is excellent in various performance characteristics. From the results of evaluation, advantages of the present invention are clear.

INDUSTRIAL APPLICABILITY

The run flat tire according to the present invention can be mounted on various vehicles.

DESCRIPTION OF THE REFERENCE CHARACTERS

2 . . . tire
4 . . . tread
8 . . . sidewall
10 . . . clinch portion
12 . . . bead
14 . . . carcass
16 . . . support layer
18 . . . belt
20 . . . band
62 . . . dimple
64 . . . land
66 . . . slope surface
68 . . . bottom surface

The invention claimed is:

1. An automobile comprising: a vehicle; and a run flat tire mounted on the vehicle, said tire comprising:
   a tread having an outer surface which forms a tread surface;
   a pair of sidewalls extending from ends, respectively, of the tread substantially inward in a radial direction;
   a pair of beads located substantially inward of the sidewalls, respectively, in the radial direction;
   a carcass extending along the tread and the sidewalls and on and between the beads;
   a reinforcing layer located inward of the tread and outward of the carcass in the radial direction; and
   a pair of load support layers located inward of the sidewalls, respectively, in an axial direction,
   wherein
   the tire has a lot of dimples on a side surface that is at an inner side in a width direction of the vehicle when the tire is mounted on the vehicle, of a pair of side surfaces of the tire,
   a number of these dimples is larger than a number of dimples present on the side surface that is at an outer side in the width direction of the vehicle when the tire is mounted on the vehicle, and
   a ratio (W/Ha) of a width W, in the radial direction, of a zone in which the dimples are formed, relative to a height Ha at an outer end, in the radial direction, of the bead from a base line, is equal to or greater than 0.60 but equal to or less than 1.20.

2. The automobile according to claim 1, wherein, in the tire, a ratio (Ha/Hb) of a height Ha at an outer end, in the radial direction, of the bead from a base line relative to a height Hb at a position of a maximum width from the base line is equal to or greater than 0.80 but equal to or less than 1.10.

3. The automobile according to claim 1, wherein a ratio of a long diameter of each dimple to a short diameter of the dimple is equal to or less than 3.0.

4. The automobile according to claim 1, wherein the number of dimples on a side surface that is at an inner side in a width direction of a vehicle when the tire is mounted on the vehicle is equal to or more than 50.

* * * * *